Figure 1:
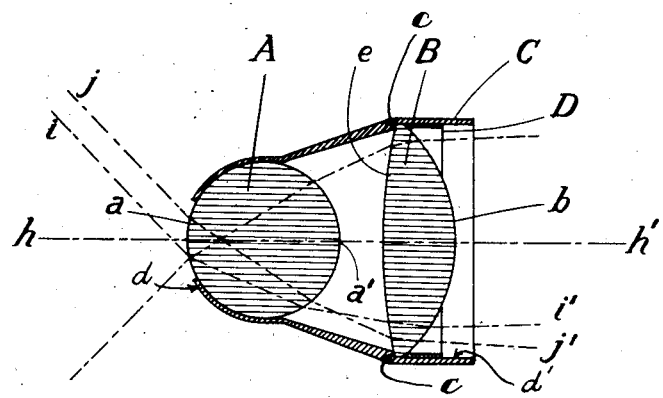

June 11, 1929.  A. F. SHORE  1,716,668

WIDE ANGLE IMAGE GLASS OR FINDER FOR CAMERAS

Filed Oct. 1, 1926

INVENTOR.
Albert F. Shore
BY
Geo. A. Hoffman
ATTORNEYS.

Patented June 11, 1929.

1,716,668

UNITED STATES PATENT OFFICE.

ALBERT F. SHORE, OF NEW YORK, N. Y.

WIDE-ANGLE IMAGE GLASS OR FINDER FOR CAMERAS.

Application filed October 1, 1926. Serial No. 138,871.

My invention relates to improvements in image-glasses or finders for cameras known as the "brilliant" type. These finders usually consists of two positive lenses and a 45 degree reflector between them. Of the lenses used, the object glass and the collector are usually thin double convex and of moderate power so that while they are admirably adapted to form an image of views not exceeding an angular spread equal to the focal length of the camera lens, they are not adapted for views of wider angle totaling 90 degrees or over, such as result from the use of wide angle lenses.

To accomplish this, recourse to what is known as thick lens optics appears necessary, and combinations of greatly increased power and delicate proportioning are required. A "brilliant" wide angle finder is needed in connection with the use of wide angle photographic lenses more than in connection with those of ordinary angle or view, for the reason that not only are the former lenses of comparatively low illuminating power, but their rays are at such an angle in relation to the axis that the image formed on the ground glass cannot be as easily observed toward the outer corners as with lenses or less angular spread and also higher illuminating power.

Figure 2:
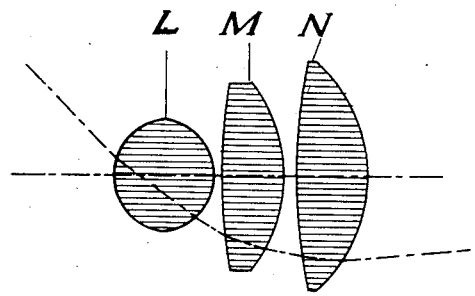

Referring to the drawing:

Figure 1 is a cross-sectional elevation of an embodiment of my new wide angle finder adapted for viewing the image horizontally while Figure 2 is a modification, in which the double convex objective lens is of less size and thinner, and hence relatively weaker, than the objective shown in Fig. 1.

In the construction of my new "brilliant" wide angle finder, shown in the accompanying drawing in its simplest form, I use for a double convex objective lens an extremely thick element whose back and front curvatures substantially form a solid sphere A made of optical glass having preferably a high refractive index of about 1.55. The objective A is provided with a double convex collecting lens B nearby in the back thereof, having enough power to bend the original incident rays coming from the widest useful angle or field after having passed through the objective, somewhat beyond parallel to or leaning toward the axial line, said collecting lens B also having a high refractive index of about 1.55 and of uneven curvatures, mounted in a case C and secured therein against a shoulder c—c by a suitable ring D. The case C is tubular in construction and open at both ends d—d'. The curved surfaces of the collecting lens B, as just described, then would have the following radii:

e, Figure 1, approximately seven times that of the ball lens at a; b, Figure 1, approximately two times that of the ball lens at a. The thickness of the collecting lens B is approximately equal to the radius of the ball lens at a, and the distance of the front surface e from the back surface a' of said ball lens is equal to five-eighths of the radius thereof.

In the modification shown in Figure 2, the double convex objective lens L is of less size and thinner than that shown in Figure 1 and is provided with a compound refractive collector unit M—N in close proximity to the back thereof, each element of said unit having for the front convex curvature thereof a radius of 9 1/2 to 1 to that of the objective L and for the back surface a radius of 2 3/4 to 1 to that of said objective. The first element M is located at a distance of 1/7 of the radius of the objective L and has a thickness of approximately the same as its radius. The second element N is spaced back approximately 1/5 of the radius of the objective and its thickness is slightly greater than that of the first element M of the collector lens unit M—N, both being of larger diameter and all having a medium high refractive index of 1.55.

In the drawing of my new wide angle finder, I have shown a preferred sphere or ball for the object glass, although I do not limit myself to the use of an element of this thickness. It may be somewhat thinner or it may be somewhat thicker. If made thinner, it must not materially interfere with the throw of the light rays after the first refraction because this would so distort the image formed by contracting the outer corners, that the second or collecting lens only with difficulty could correct it. In other words, a more complicated optical system would be required with two back collecting lenses, as illustrated in Fig. 2, each of relatively less power than the lens of Fig. 1.

It is understood also that in any departure from the refractive index as cited, a certain amount of variation would be called for in the proportioning of particularly the collector lenses e—b and M and N, as well as the separating distance between the first and the second and even the third lens, (Figure 2).

To more clearly illustrate what would thus occur, I have shown in Figure 1 the path of one set of centrally located incident rays, the width of which is equal to about one-half of the available aperture in an optical combination of this kind.

It is evident that in order to make the refracted light rays which form the image visible to the unaided eye, only those rays which are either parallelized or which are refracted back toward the axis $h$ and $h'$ are rendered visible, such as ray $i$ and $i'$ but not ray $j$ and $j'$, unless to some extent by the extra collecting lens N, Figure 2.

It is the object, therefore, of the collecting lens or lenses to provide not only the necessary degree of total refractive power but also to take up the image formed by the object glass which is necessarily contracted at the corners to bring out the said corners to make the image rectilinear without flaring and spreading out at the said corners, as is the tendency when equivalent refractive power is obtained by the use of a series of thinner lenses.

In operation, the simple combination shown in Figure 1, and the compound combination of Figure 2, may be used directly, that is with the unaided eye. While these combinations are adapted for observation horizontally direct, it is apparent that an auxiliary 45 degree reflecting prism or mirror (not shown) may be used in the back of the collecting lenses B and M and N to permit vertical observation. Likewise, a magnifier (not shown) may be used some distance back from the collecting lenses B and M and N, to permit a closer observation and to magnify the image, or an auxiliary magnifying lens or eye piece may be permanently attached. If said magnifying lens is of considerable power, some modification may have to be made in the general specification and position of the lenses, even perhaps resorting to lamination, particularly of the objective element, without materially departing, however, from the general scope of the invention.

What I claim is:

1. An optical wide angle finder for cameras, embodying a double convex objective lens having back and front curvatures substantially forming a solid sphere, and a positive refractive unit nearby in the back thereof having enough power to bend the incident rays coming from the widest useful angle or field, after having passed through the objective, somewhat beyond parallel to or leaning toward the axial line.

2. An optical wide angle finder for cameras, embodying a double convex objective lens having back and front curvatures substantially forming a solid sphere, and a positive refractory collector unit nearby in the back thereof having enough power to bend the incident rays coming from an angle of 45 degrees relative to the axial line, after passing through the objective, somewhat beyond parallel to or leaning toward the axial line, said collector unit being somewhat larger in diameter than said objective lens.

3. An optical wide angle finder for cameras, embodying a double convex objective lens having back and front curvatures substantially forming a solid sphere, and a positive refractive collector unit nearby in the back thereof having enough power to bend the original incident rays, having a total angle of over 90 degrees, somewhat beyond parallel to or leaning toward the axial line, after passing through the objective, said collector unit being somewhat larger in diameter than said objective lens and of such thickness as to eliminate the tendency of stretching at the extreme corners of the image after correcting the oppositely distorted image formed by the objective, and having a greater curvature at the back than at the front.

4. An optical wide angle finder for cameras, embodying a double convex objective lens having back and front curvatures substantially forming a solid sphere, and a positive refractive collector unit nearby in the back thereof, having a curvature for the first refractive surface of a radius approximately seven times that of the objective lens and for the second refractive surface a radius approximately two times that of said objective lens, while the thickness of the collector unit is approximately equal to the radius thereof, and the distance from the back surface of the objective lens to the front surface of the collector unit is somewhat more than one-half of the radius of the objective.

5. An optical wide angle finder for cameras, embodying a double convex objective lens having back and front curvatures substantially forming a solid sphere, and a positive refractive collector unit nearby in the back thereof, having a curvature for the first refractive surface of a radius approximately seven times that of the objective lens and for the second refractive surface a radius approximately two times that of said objective lens, while the thickness of the collector unit is approximately equal to the radius thereof, and the distance from the back surface of the objective lens to the front surface of the collector unit is somewhat more than one-half of the radius of the objective, said objective lens and said collector unit having respectively a refractive index of approximately 1.55.

6. An optical wide angle finder for cameras, embodying a double convex objective lens having back and front curvatures substantially forming a solid sphere, and a compound refractive collector unit in close proximity to the back of the objective lens, each element of said unit having for the front convex curvature thereof a radius of 9 1/2 to 1 to that of the objective lens and for the back surface a radius of 2 3/4 to 1 to that of said objective, the first element of said unit being located at a distance of 1/7 of the radius of the objective and having a thickness of approximately the same as its radius, and the second element of said unit being spaced back approximately 1/5 of the radius of the objective and the thickness of which second element is slightly greater than that of the first element of said unit, both elements being of larger diameter than the objective lens and all having a medium high refractive index of 1.55.

7. An optical wide angle finder for cameras, embodying a double convex objective lens of substantially spherical form, and a refractive collector unit in close proximity to the back of said objective lens, a suitable casing for holding the separate elements in their proper places, an aperture of limited size in the front of the casing and an opening in the back of said casing for viewing the image formed through the medium of the objective and collector elements, substantially as described.

In testimony whereof, I affix my signature.

ALBERT F. SHORE.